James G. Miner.

117662 Subsoil & Drain Plow.

Patented Aug 1 1871

WITNESSES.

INVENTOR.

117,662

UNITED STATES PATENT OFFICE.

JAMES G. MINER, OF NASHVILLE, TENNESSEE.

IMPROVEMENT IN PLOWS.

Specification forming part of Letters Patent No. 117,662, dated August 1, 1871.

*To all whom it may concern:*

Be it known that I, JAMES G. MINER, of Nashville, in the county of Davidson and State of Tennessee, have invented a new and Improved Subsoil and Drain-Plow, of which the following is a specification:

The object of my improvement is to combine in a mole-plow the essential elements of strength, lightness, and simplicity, avoiding unnecessary multiplication of parts, and providing a means of regulating the draft so as to admit of the mole having an equal and uniform bearing in the ground, whether the plow be drawn by a single horse or by two or more.

Figure 1:
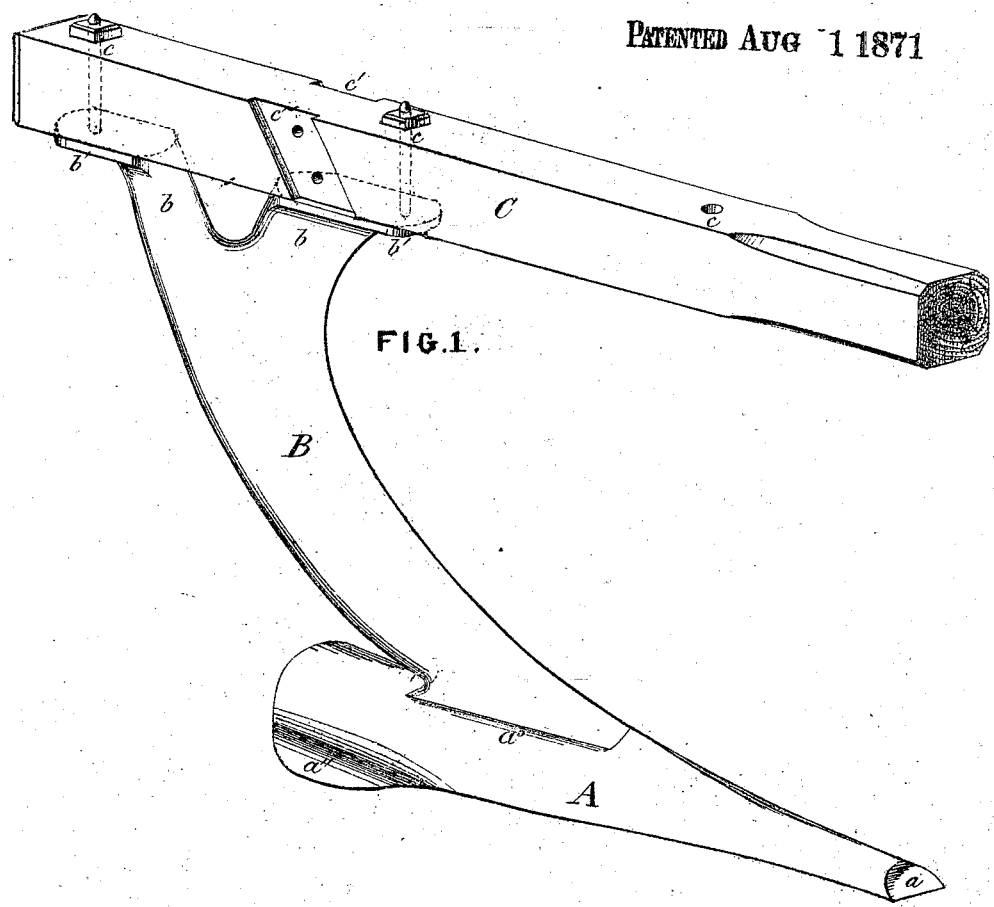
Figure 2:
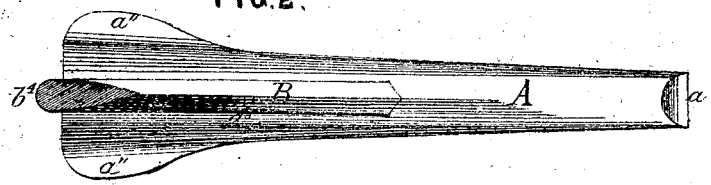
Figure 3:
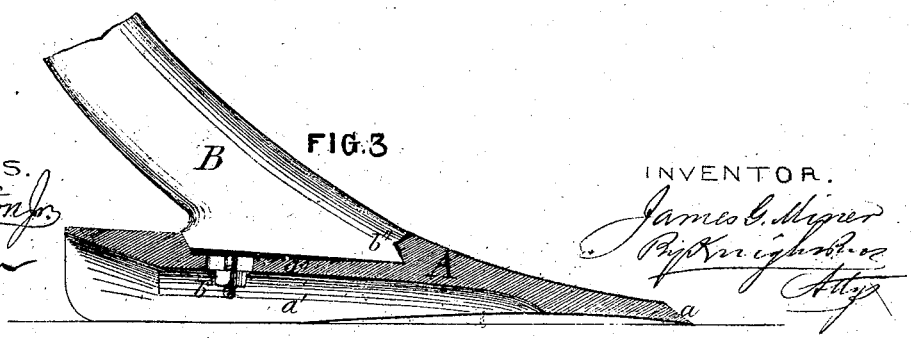

Figure 1 is a perspective view of the plow, the end of the beam being cut off and the handles omitted, showing the several parts in position. Fig. 2 is a top view of the mole, showing the colter inserted in the same, and partly in section. Fig. 3 is a central vertical longitudinal section through the mole, a part of the colter being shown in elevation.

In the different figures like letters of reference indicate corresponding parts.

The mole A, which may be formed of any suitable material, has a chisel-like bevel, $a$, in front, forming a sharp cutting-edge, slanting downward and forward, to enable it to more readily penetrate the soil and assist in resisting any upward movement of the point which would tend to cause it to approach the surface of the ground. The mole gradually increases in dimensions, both laterally and vertically, from front to rear, for the purpose of enabling its more ready passage through the soil, and its rear portion is hollowed out underneath to within about one-fourth of its length (say five inches) from the point, as shown at $a'$, Fig. 3, thus rendering it lighter, and, at the same time, decreasing the frictional surface of its base upon the ground, while this hollow also affords a suitable space for the means of attachment to the colter, which is effected by a threaded bolt carrying a nut on its lower end, or other equivalent means. The base of the mole gradually rises from the front backwardly to the height of about half an inch, and then descends toward the rear, forming an arched longitudinal under surface, and causing the mole to bear principally on its two extremities, thereby insuring its taking the ground without raising or lifting by the plowman. The sides of its base in plan are bounded by right lines diverging from front to rear. If a wider cut is desired a mole similar in shape and construction, but having feather-edged wings, shown at $a''$ $a''$, Fig. 2, of any practicable width, and extending forward as far as required, is employed. The upper surface of the mole may be in section, an inclined plane, or an inclined double-cycloidal convex surface, as desired, but in either case a mortise, $a^3$, is formed in the mole at its mid-width, extending from a point some distance in front of its mid-length to a short distance from its rear end, so that the longitudinal center of the mortise shall be in rear of the mid-length of the mole. The mortise has a downward slope from rear to front at bottom, and is beveled at each end, the rear end being beveled from above forwardly, while the front end is doubly beveled, so as to form a miter-joint with the colter, as shown at $b''$, Fig. 3. A hole near the rear of the mortise receives the bolt by which the mole and colter are connected. A "fin" is raised upon the longitudinal center of the mole, commencing at the front of the mortise and extending forward, terminating near the point. This serves to strengthen the mole, and also to divide the hard subsoil, allowing the colter to pass through the earth more freely. It constitutes a continuation of the epicycloidal curve formed by the front of the colter-standard when the latter is inserted in the mortise before described. The mole is hardened on its under surface in any usual manner, to prevent too rapid wear.

The general dimensions which I prefer are about twenty-one inches length of mole, the front end of mortise being about nine inches in rear of the point, and its rear end about five inches in front of the back end of the mole, the bottom sloping downwardly about half an inch from rear to front.

The colter-standard, made of any suitable material, is so constructed as to form an epicycloidal curve along its front or cutting-edge, said curve being made to form as small an angle as practicable with the mole. I prefer, in practice, a curve such that a line drawn from the point of the mole to the colter-standard, and forming an angle of thirty degrees with a horizontal plane, shall strike the mid-length of said standard at a point about sixteen inches above the base of the mole. The colter is made as thin as the nature of the material used in its construction will permit consistently with proper strength, its front edge being sharp or feathered. The back is preferably rounded off, its curve from top to bottom corresponding generally with that of the front. A section is shown at $b^4$, Fig. 2. The upper part of the colter-standard is transversely bifurcated, as represented at $b\ b$, Fig. 1, each branch being separately fastened to the beam by a bolt or bolts, shown at $c$, Fig. 1, passing through ears or flanges $b'\ b'$, Fig. 1, at top of said bifurcated ends, and thence through the beam, and secured thereto by nuts on top, or other equivalent means of attachment. This bifurcation allows the bolts to be separated by a considerable interval, (say eleven or twelve inches,) enabling a better bearing and firmer attachment of the beam. The flanges $b'\ b'$ are so formed that their upper surfaces shall have a slight backward inclination longitudinally, in order to slightly elevate the front of the beam, (say about one-fourth of an inch in the length of the mole,) to cause the plow to take better hold of the ground. The foot of the colter is shaped so as to fit the mortise in the mole, being beveled at rear, and having a miter or dovetail, $b''$, Fig. 3, at front, which, or one branch of it, extends under the backward projection of the mole at front of the mortise, which prevents any upward movement of that part. A threaded bolt or stud passes from the colter through a slot near the rear of the mortise, and, by means of the nut at $b^3$, Fig. 3, in the arched cavity before described, the colter is drawn down, its heel being firmly and securely held in place by the bolt, and its front by the dovetail before mentioned. The plow-beam is of the usual form, and has three equidistant holes, $c\ c\ c$, for the reception of the bolts by which it is attached to the colter, thus admitting of the latter being shifted either forward or backward, according as one or two horses are used. For draft with one horse, cutting from eleven to thirteen inches deep, the colter is shifted forward, the rear branch is bolted at the center hole, and the forward branch at the front hole, allowing a length of about four feet four inches to the front of the beam. For draft with two horses, cutting from fourteen to sixteen inches deep, the front branch is bolted at the center hole and the rear branch at the rear hole, allowing a length of about five feet four inches to the front of the beam. The handles are placed as near the center hole as possible, to answer for either arrangement of the colter without changing their position. The mortises in which they are received and secured are shown at $c'\ c'$, Fig. 1.

I am aware that subsoil and cultivator-plows have been before constructed having a general similarity in external shape to my own, being broader toward their rear than at front, and provided with wings or flanges attached to the colter, for effecting the objects which my mole is designed to do, and also, that such plows have been so arranged that the relative inclination of the plow-beam and colter with each other could be varied; but I know of no subsoil-plow having the mole or share and rear flanges in one piece, and having a mortise therein for affording a solid bearing to the foot of the colter, and completely surrounding the same, so as to give firm resistance in every direction to any twisting or jerking motion. So far as I am aware, the moles or shares of such plows have been constructed so that their under sides had a bearing throughout their whole length, causing a greater draft without greater displacement of earth, and requiring more labor to keep them to a given depth in the soil. I further do not wish to be understood to claim as new the mere attachment of the colter in rear of the longitudinal center of the mole, unconnected with the mode of attachment, this position of the colter having been adopted before, as shown in the patents of Utley, Heaton, McCollom, and Murphy, where the colter is attached entirely at the rear of the operative part of the mole; nor do I desire to claim the bifurcation of the colter-standard.

I claim as my invention—

1. The mole A, longitudinally arched from front to rear, with its under surface recessed at rear, and having a mortise, $a^3\ b''$, on top and in front of its greatest sectional area to receive and surround the tenoned foot of the colter B, which is secured thereto by the bolt $b^3$, substantially as represented and described.

2. The combination and arrangement, in a subsoil or mole-plow, of the beam C and colter B, enabling the latter to be shifted forward or backward, and secured by means of the vertical holes $c\ c\ c$ in said beam, and bolts passing perpendicularly therethrough, so that said plow can be used either as a one-horse or two-horse plow, substantially as specified.

J. G. MINER.

Witnesses:
J. D. WALKER,
JOHN C. HAGAN.